United States Patent [19]

Kulakowski et al.

[11] Patent Number: 5,018,126
[45] Date of Patent: May 21, 1991

[54] CHECKING MEDIA OPERATIONS AND RECORDING DURING OPTICAL RECORDING

[75] Inventors: John E. Kulakowski; Rodney J. Means; David M. Oldham; Morovat Tayefeh, all of Tucson, Ariz.

[73] Assignee: International Business Machines Corporation, Armonk, N.Y.

[21] Appl. No.: 504,449

[22] Filed: Apr. 4, 1990

Related U.S. Application Data

[62] Division of Ser. No. 239,863, Sep. 2, 1988, Pat. No. 4,941,139.

[51] Int. Cl.$^5$ .................................. G11B 7/00
[52] U.S. Cl. ........................................... 369/58
[58] Field of Search ................ 369/54, 58, 59, 116, 369/122

[56] References Cited

U.S. PATENT DOCUMENTS

| | | | |
|---|---|---|---|
| 3,654,624 | 4/1972 | Becker et al. | 346/138 |
| 3,657,707 | 4/1972 | McFarland et al. | 350/296 |
| 4,005,259 | 1/1977 | Kaneko | 358/128 |
| 4,145,758 | 3/1979 | Drexler et al. | 365/200 |
| 4,225,873 | 9/1980 | Winslow | 369/54 |
| 4,494,226 | 1/1985 | Hazel et al. | 369/45 |
| 4,570,251 | 2/1986 | Yokota et al. | 369/100 |
| 4,611,318 | 9/1986 | Winslow | 369/54 |
| 4,631,713 | 12/1986 | Romeas et al. | 369/54 |
| 4,648,085 | 3/1987 | Shimonou | 369/54 |
| 4,788,674 | 11/1988 | Maeda et al. | 369/54 |
| 4,791,622 | 12/1988 | Clay et al. | 369/59 |
| 4,809,253 | 2/1989 | Baas et al. | 369/54 |

*Primary Examiner*—Donald McElheny, Jr.
*Attorney, Agent, or Firm*—H. F. Somermeyer

[57] ABSTRACT

A magnetooptic recorder player provides for residual data checking and media defect checking. Media defect checking is effected by comparing the reflected light intensity of a modulated optical beam with the input data characteristics. A difference between the input data and the detected light intensities represents asperities in the record media. Residual data is checked by selectively gating MO detected signals during recording, which are intermediate the high intensity light beam pulses used for recording signals. Both the detected residual data and detected media asperities are counted for each addressable record storage area on the medium.

5 Claims, 2 Drawing Sheets

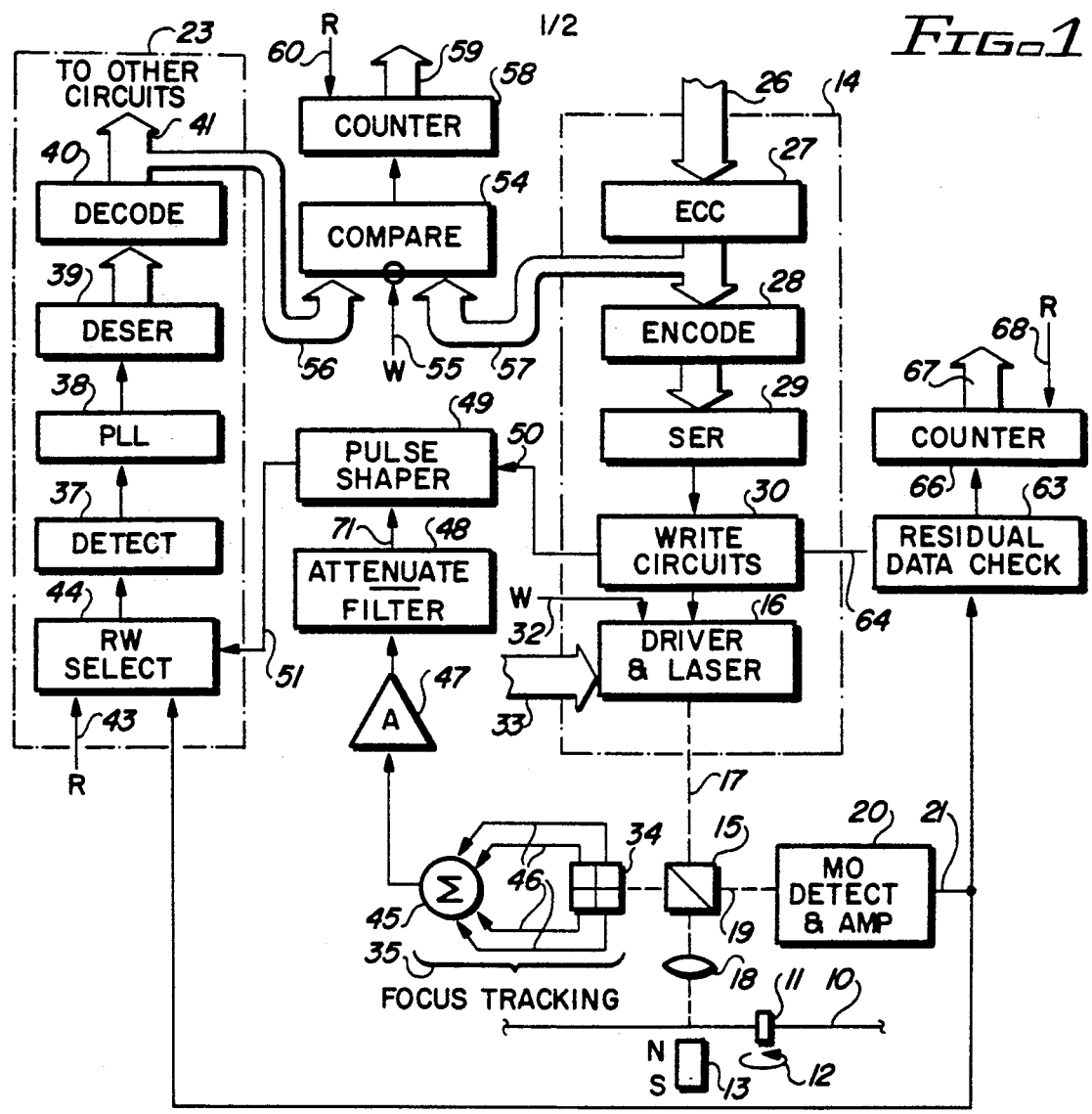
FIG. 1
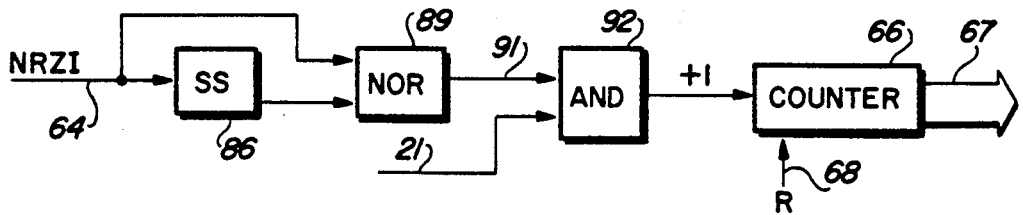
FIG. 2
FIG. 4

CHECKING MEDIA OPERATIONS AND RECORDING DURING OPTICAL RECORDING

CROSS REFERENCE TO RELATED APPLICATION

This is a divisional application of Ser. No. 239,863, filed Sept. 2, 1988, now U.S. Pat. No. 4,941,139 issued July 10, 1990.

FIELD OF THE INVENTION

The present invention relates to optically recording information-bearing signals using non-ablative recording techniques.

BACKGROUND OF THE INVENTION

Several recording technologies have been used over the past years for recording data or other forms of information-bearing signals onto optical record members, such as rotatable disks. Ablative recording has been used for the so-called write once/read many (WORM) recording systems. The information recorded on the record member is optically sensed by shining a light beam onto the recorded area and sensing the intensity modulation in the reflected light. For ablative systems, the medium space between ablated areas provides for high reflection of light while the ablated areas reflect very little, if any, light into the sensing mechanism. The record member intensity modulates a read beam for enabling faithful recovery of the recorded information. In a similar manner, so-called phase-change materials record information by changing the phase of the record member between crystalline and amorphous states. The surface reflectivity of the two states is different for intensity modulating a read light beam. Bipolymer systems can also be used, which reflect or transmit light of varying colors with varying intensities. Yet another system for optical recording uses magnetooptic technology. During the recording process, a magnetic steering field envelopes the area to be recorded. A laser beam shines onto the recording area for heating a spot to be recorded above its Curie point temperature on the disk magnetooptic coating. Upon cooling, the heated area magnetically follows the magnetic steering field for recording the information represented by a modulated write beam from a laser. For reading or tracking through the recorded area, the laser light beam has a reduced intensity such that the record area is not heated above the Curie point. Generally, such magnetooptic (hereinafter MO) record members require erasure to a reference state before each recording operation, such as to a binary zero state (a so-called south pole being adjacent the recording and reading surface of the disk). Then, on a subsequent access to the record member, data can be recorded by selectively thermomagnetically switching portions of the record member such that the north pole terminates at the reading and recording surface of the disk. The magnetic steering field is reversed during erasure.

An unfortunate characteristic of many MO record members is that of media defects. Many of the defects can occur or be generated when the record member is first manufactured. Depending upon record member construction, additional defects can arise after the manufacture and even after data or other information-bearing signals are recorded on an MO record member. Further, the size of the initial defects resulting from the manufacturing process may change in size. As a result, powerful error detection and error correction code (ECC) systems are employed with the MO disk for accommodating such media defects. It is to be appreciated that the other media types are also subject to high defect rates The effective defect rates in MO are often higher than other magnetic recording media because of the increased density (smaller size signal recording areas) than commonly employed with magnetic recorders. Many magnetic media are manufactured which use expensive, high quality manufacturing processes. It is desired to avoid such additional expense in the optical recording area, yet provide for a high level of data integrity during recording and readback operations using optical media. Such integrities include checking the media for new or old defects, and checking for residual data, i.e., whether or not the record area has been faithful erased for faithful MO recording and readback. Such checks also test the operativeness of the data signal channel electronics.

DISCUSSION OF THE PRIOR ART

U.S. Pat. No. 4,494,226 shows an optical recorder of the ablative type employing a so-called three-beam head. One of the beams leads the record sensing and recording beams for detecting media defects. While a three-beam head certainly provides a faithful media integrity checking system, it is desired to avoid the constructional expense and complexity of providing a three-beam head in an optical recorder. Yet, it is desired to provide for media checking during recording in an optical recorder.

U.S. Pat. No. 4,570,251 shows another ablative optical recorder. This patent teaches sensing the reflected light from the laser beam when not recording pits, i.e., between ablating a record medium for recording binary ones on the disk. According to this patent, such sensing between ablatively recording pits detects the presence of prior ablated areas as reduced light reflection. Upon detecting an ablated area, recording is aborted. It is parenthetically pointed out that a greatly reduced reflected light intensity may also indicate a media defect. The patent apparently shows a desire to provide for residual data checking in those systems wherein second media light intensity modulates a read beam to recover recorded information-bearing signals from a record medium.

U.S. Pat. No. 4,648,085 shows reading ablatively recorded information during recording for verifying successful recording. Again, intensity modulation of the read beam by the record member is the basis for sensing a successful recording operation.

SUMMARY OF THE INVENTION

It is an object of the present invention to enhance the media and data integrity of optical recording apparatus, particularly for those optical recording systems employing recording technologies that yield recorded information by means other than intensity modulation of a read beam by the information indicia of the optical record disk.

In accordance with one aspect of the present invention, light used during a recording operation and reflected from the record member is intensity detected and then compared with the input signal. A non-compare indicates a media defect.

In a second aspect of the invention, which may be combined with the first aspect, during the intermediate periods of time between write laser pulses may be used to optically sense the parameters of the record medium. Residual or unerased data transitions or media defects can be sensed. The sensing of such residual media effects can be used in a write checking operation.

The number of detected defects and residual data bits are counted for indicating, respectively, media integrity and data integrity of the record areas. In a preferred form of the invention, the operation of detecting and comparing is performed in each independently addressable record area for indicating the data integrity and media integrity for each such respective area. In a preferred embodiment of the invention, the electrical circuits employed for other operations such as readback, during recording are switched into the recorder's data path for providing such media and data integrity checking.

The circuit operation can be checked by comparing laser light emitted from the laser's secondary output with the output of the recording circuits; such reduced checking does not verify operation of the optical portion of the recorder.

The foregoing and other objects, features, and advantages of the invention will be apparent from the following more particular description of preferred embodiments of the invention, as illustrated in the accompanying drawings.

BRIEF DESCRIPTION OF THE DRAWING

FIG. 1 is a simplified block diagram of an optical recorder embodying the present invention.

FIG. 2 is a pulse shaper usable in the FIG. 1-illustrative embodiment.

FIG. 4 is a residual data detector usable in the FIG. 1 illustrated recorder.

DETAILED DESCRIPTION OF THE ILLUSTRATIVE EMBODIMENTS

Figure 3:
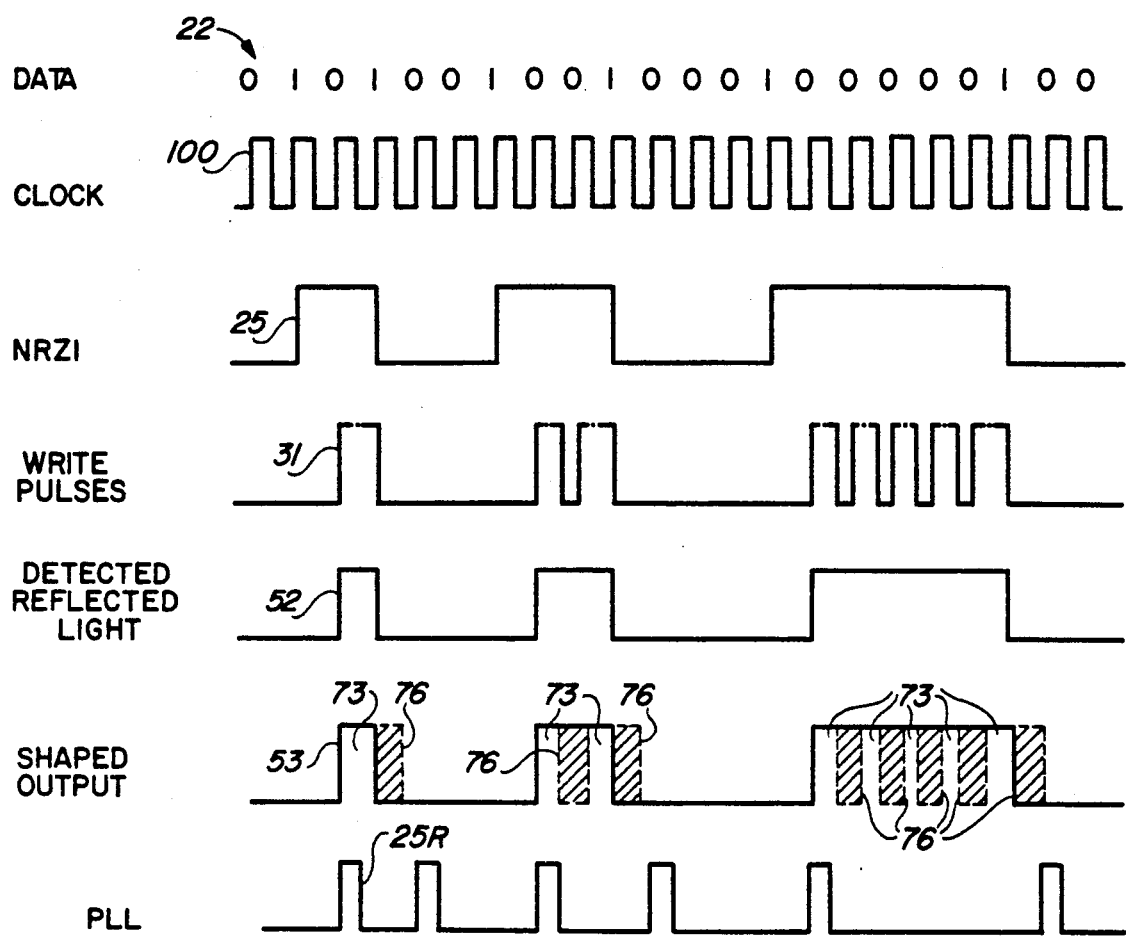
FIG. 3 is a set of idealized electrical signal waveforms used to describe one aspect of the invention.

Referring now more particularly to the drawing, like numerals indicate like parts and structural features in the various figures. Referring now more particularly to FIGS. 1 and 3. A magnetooptic (MO) optical recording member in the shape of a disk 10 rotating about an axis on drive spindle 11 is employed for recording information and yielding information based upon parameters that do not alter the intensity of the reflected light of a sensing laser beam. Rather, the so-called and well-known Kerr effect which rotates the linear polarization of an incident reading laser beam effects recovery of the recorded information. In the case of MO disk 10, the magnetic properties of the disk are the optically sensible recording parameter which yields information without altering the intensity of the reflected sensing laser light beam.

Disk 10 rotates in the direction of the arrow 12 by a motor (not shown) attached to drive spindle 11. Magnetic steering means 13 provides a magnetic steering field for determining the direction of remnant magnetization during the recording process. It is preferred that an electromagnet provide magnetic steering field which substantially floods the recording area with the magnetic steering field; the location of the recording laser beam determines which minute portion of the recording area will have its remnant magnetization reversed, from the erasure or south direction to the binary one indicating north direction. Similarly, during erasure, the magnetic steering field is reversed and an erasure light beam continuously impinges on the portion of the recording area of disk 10 to be erased.

For simplicity, an entire optical recorder of the data information type is not shown. Both portions of such a recorder directly applicable to the actual recording and readback of information-bearing signals are shown and described for understanding the operation of the present invention. It is to be understood that format controls clocking and the other operations required in such a recorder and readback player must be added to the FIG. 1 showing to complete a practical MO recorder and playback apparatus. The write or recording circuitry 14 receives signals from a connected data processor, communication line, keyboard, etc. (none shown) in a so-called "system form" such as represented in ASCII or EBCDIC coding. Circuits 14 convert the received information-bearing signals into an intensity modulated light beam transferred by MO optics 15 onto disk 10. The laser and laser driver 16 supplies the light beam over path 17 through the optics 15, thence through objective lens 18 (it may also provide focusing and tracking operations, as is known) to the recording surface of disk 10. The light reflected from the surface of disk 10 during either reading or writing travels back through objective lens 18, then into optics 15. The reflected light is directed for detection of data over light path 19 to MO detector and amplifier 20. The construction of detector and amplifier 20 follows the known techniques of prior art MO playback apparatus. The detected output signal then travels over line 21 to readback circuits 23. Readback circuits 23 detect the supplied signals and convert the supplied signals from the recorded format to a system format for use by a connected data processor, and the like. The reflected light is also directed to a so-called quad detector 34. Detector 34 contains four photodetectors represented by the four small squares connected to focus and tracking circuits (not shown) as represented by bracket 35 for providing the usual focusing and tracking operations associated with an optical disk.

Recording circuits 14 receive data signals 22 (see FIG. 3) over bus 26 from the associated circuits (not shown) of the data recorder used for connecting the illustrated circuits to a using apparatus, such as a data processor. ECC circuit 27 adds error detection and correction redundancy of a known type for enabling faithful recording and reproduction of the received data 22. Then encode circuit 28 receives the composite received data and ECC redundancy in a so-called system form and encodes same into a data recording form. Such data recording forms are well known and include RLL (run length limited) code such as 1,7 and 2,7 d,k recording codes. Serializer SER 29 serializes the data into the well known NRZI format represented by signal 25 of FIG. 3. Write circuit 30 provides for modulation of the received NRZI signal 25 into write pulses 31 which are supplied to driver and laser 16 in a known manner. Write pulses 31 enable the laser to emit light pulses through optics 15 to disk 10 during those periods in which the magnetic remnants of the MO layer (not shown) of disk 10 are to be reversed. Relatively high intensity laser light-corresponding to the write pulses 31 are emitted by the laser to the disk 10. In the intervening periods between the write pulses 31, the emitted light intensity can be that of a read laser beam, no limitation thereto intended. Write enable line W 32 enables the driver and laser 16 to respond to the output signals of write circuit 30 for generating the intensity modulated write light beam. Write enable lines 32 and 57 carry control signals signifying recording (write) operations received from a usual recorder control (not shown). Bus 33 represents the inputs to the driver and laser 16, to accommodate radial changes on the disk, i.e. light intensity changes to accommodate different relative lineal speeds of the recording area with respect to the light beam, all as is well known. During a readback operation, (in the absence of a write enable signal on line W 32) the output light intensity from driver and laser 16 is at the read level. During erase operations, a control signal (not shown) received over bus 33 causes the driver and laser 16, in a timed relationship to the illustrated clock signal 100 of FIG. 3, to provide continuous light (or a series of pulses) for erasing a track on the disk with the magnetic steering field being oriented in the erasure direction.

During readback of the magnetically-recorded, optically-sensible MO signals, readback circuit 23 receives the signals from MO detector 20 in a known manner. In circuit 23, signal detector 37 converts the received MO detected signal into a detected pulse form. The detected pulses are a replica of write pulse 31. The detected pulses are then supplied to phase lock loop PLL 38, for generating a read clock for converting the detected pulses into NRZI form, such as is shown by numeral 25. DESER 39 deserializes the signals and supplies them to decode circuit 40. Decode circuit 40 converts the signals from record format (like 1,7 or 2,7 RLL coding) to the system format for transmission over bus 41 to other circuits of the recorder (not shown). Such other circuits may include ECC for correcting detected errors. The above description of FIGS. 1 and 3 describe typical recording, readback circuits and circuit timing for use in an MO recorder.

Next media surface evaluation during a recording operation is described with continued attention to FIGS. 1 and 3. During recording, read circuits 23 are disconnected from MO detector amplifier 20 and reconnected to receive later described processed output signals of quad detector 34. The output signals of read circuit 23 are redirected from other circuits to compare circuit 54. Compare circuit 54 receives the input signals to be recorded from ECC 27 for comparison with the readback signals. Any miscompares are sent out as error signals to counter 58 as later described. The count in counter 58 indicates the number of detected defects in the area currently being recorded. It is preferred that the area be limited to one addressable section, such as circumferentially extending sectors, CKD (count, key, data) record areas and the like.

To switch readback circuits 23 away from MO detector and amplifier 20, RW select circuit 44 is electrically interposed between line 21 and detect circuit 37. In the read mode, a signal received over line 43 actuates RW select circuit 44 to electronically transfer the signals from line 21 to detect circuit 37. When MO recording is to occur, a signal on line 43 actuates RW select circuit 44 to disconnect line 21 from detect circuit 37 and reconnect the processed signal output of quad detector 34 as received over line 51 to detect circuit 37. RW select circuit 44, of known design, is an electronic switch having two inputs and a single output. Alternately, quad detector could be replaced by a detector dedicated to the checking function of this invention.

Quad detector 34 receives the intensity modulated light from the reflected light through objective lens 18 which is precisely indicative of the light intensity emitted by laser 17 as reflected by disk 10 surface. Any asperities in the surface of disk 10 result in diminished light intensity reaching quad detector 34, i.e. indicate undesired surface asperities of disk 10. In the areas of disk 10 having a satisfactory recording layer, the intensity modulation reflected by disk 10 accurately reflects the write pulses 31 of FIG. 3. Summing the output signals of the four elements of quad detector 34 in sum circuit 45 provides a precise indication signal 52 of the write pulses 31. Pulses 52 have to be phase adjusted (for circuit delays), as later explained, and smoothed to become more rectangular and therefore more reliably indicate the modulated write beam reflected from disk 10. Electrical lines 46 respectively connect the four photodetectors of quad detector 34 to sum circuit 45. Amplifier 47 receives the summed output signal 52 from sum circuit 45 and supplies same to attenuate and filter circuit 48. Attenuate and filter 48 is designed, using known circuit design techniques, for adjusting the amplitude and the shape of the readback signals from quad detector 34 for use in pulse shaper 49. Pulse shaper 49 combines the replica of write pulses 31 received over line 50 from circuits 30 to shape the quad detector output pulses 52 to record read circuits 23 input signal 53 on line 51. Input signals 53 are detected by detect circuit 37 and applied to PLL 38 to produce the output pulses 25R, which represent a series of pulses time coincident with the signal transitions of NRZI signal 25, the original write signal. Therefore, a faithful reproduction of the NRZI signal 25 is provided by the described circuits during the write mode, provided no surface asperities or defects occur on media or disk 10. Absence of any of the pulses 25R is a media defect indication which will be detected as a media error indication by compare circuit 54.

Decode circuit 40 and deserializer 39 respond to the pulses 25R from PLL 38 in the same manner as they would for signals from MO detector and amplifier 20. Decode circuit 40 supplies the decoded signals over bus 56 to compare circuit 54. Compare circuit 54 is enabled by a write or record indicating signal received from a recorder control (not shown) over line 55, for comparing the pulses 25R with the input write data signals received over bus 57 from ECC 27. As long as compare circuit 54 detects identity between the signals on buses 56 and 57, no media defects are being detected. Whenever a miscompare occurs between such signals, compare circuit 54 supplies an error indicating signal incrementing counter 58. Counter 58 is initially reset by the signal received over line 60 at the onset of writing each addressable data storage area on record medium 10. Upon completion of the recording operation, circuits (not shown) sense the count value in counter 58 as carried on bus 59 for capturing the defect count for the current addressable data storage area being recorded. Evaluation of the media may then ensue and is beyond the scope of the present description. A large count in counter 58 may result in marking the just-evaluated addressable data area as being unavailable for recording signals. It is noted that the signals processed by elements 45 through 49 represent a measure of the reflectivity of disk 10 in that changes in reflectivity will further modulate the modulated write laser beam being reflected. Since the recording parameters are not optically sensible by intensity modulation, such signal processing is not a readback of signals actually stored on disk 10 during the current recording process.

In addition to monitoring media 10 quality and detecting medium asperities, the present invention provides for checking residual data in the area being recorded which may not have been erased by a prior erasure operation (not described nor shown, but well known). Residual data check circuit 63 (later described) receives a replica signal of NRZI 25 from write circuits 30 during the recording operation. Residual data check circuit 63 simultaneously receives the signals on line 21 as detected by MO detector and amplifier 20 which are BETWEEN SUCCESSIVE ONES OF THE WRITING OR RECORDING LIGHT INTENSITY PULSES FROM LASER 16. That is, intermediate the actual magnetic reversals on disk 10 circuits of the present invention, circuits 63 optically sense the recorded parameters on disk 10 in the recording area. Such sensible parameters should always indicate an erasure direction of all binary zeros. Residual data check circuit 63 supplies an output pulse each time a non-erasure condition is detected during periods between recording pulses. Circuit 63 increments counter 66 once for each detected non-erasure.

The NRZI replica signal on line 64 times the operation of residual data check circuit 63 for performing the residual data checking operation. Counter 66 is initially reset by signal received over line 68 at the onset of each recording operation in an addressable or otherwise identifiable record storage area of disk 10, such as described for the operation of counter 58. The count value is supplied over bus 67 to be sensed at the termination of the recording operation for further processing beyond the scope of the present description. Such evaluation may show that, because of the detected residual data, the recording in the current recording area is inaccurate (no data integrity); therefore, data recovery and re-recording should ensue.

The operation of pulse shaper 49 of FIG. 1 is now described with respect to FIGS. 2 and 3. The intensity modulated indicating signal from sum circuit 45 is received by pulse shaper 49 over line 71 as an input signal to linear single shot circuit 72 (hereafter LSS). LSS outputs a squared signal over line 74 which has a duration greater than one clock cycle, i.e. greater than the minimum duration of write pulses 31. LSS 72 is triggered each time a peak of quad-detector output pulses 52 is received over line 71. Write compensation control signals supplied over line 50 from write circuits 30 are used in AND circuit 75 to gate the output signal of line 74 to line 51 during the plus (+) detected reflected light 52 durations. The line 50 signal and the LSS 72 supplied negative signal over line 81, which is stored in capacitor 80 for delaying same, enable AND circuit 75 to lengthen the signal on line 74 for enabling AND circuit 75 to pass the L-shaped output signals 53 to line 51. This delay compensates for circuit delays found in write circuits 30, driver 16, sum circuit 45 and circuits 47 and 48. This delay compensation provides good coincidence between the output of readback circuits 23 and the input signal received by compare circuit 54 over bus 57. Comparator 82 combines the line 81 signal with the line 50 signal to supply a control or AND circuit enabling signal over line 83 to AND circuit 75. The unhatched portions 73 indicate the minimum pulse width of pulses 53. Hatched portion 76 indicates maximal pulse durations of each actuation of LSS 72 to the output by AND circuit 75. Such delays are determined by measurement, beam shape, power levels and electrical circuit characteristics.

Figure 5:
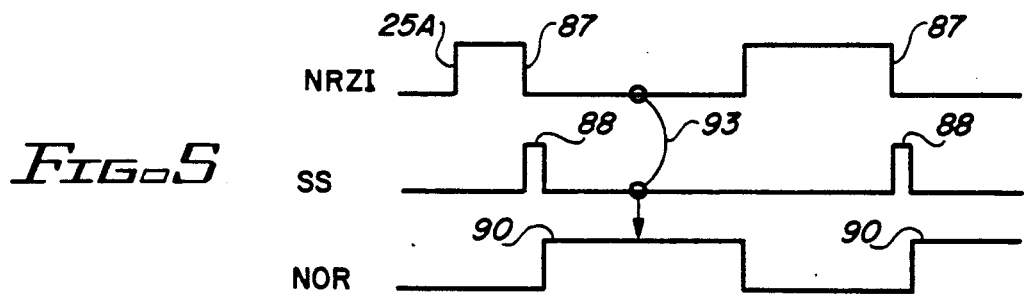
FIG. 5 is a set of idealized and simplified signal waveforms usable for explaining the operation of the FIG. 4 illustrated apparatus.

Operation of residual data check circuit 63 is described with respect to FIGS. 4 and 5. Single shot circuit SS 86 receives the NRZI 25 replica signal 25A over line 64 from write circuits 30. SS 86 outputs a narrow pulse signal 88 at each negative transition 87 of NRZI replica signal 25A. NOR circuit 89 receives both signals 25A and 88 to produce residual data check enabling signal 90 on line 91 for enabling residual data check counting. Signal 88 provides for a small delay in the sensing of residual data and compensates for signal processing delays and light beam spot size characteristics. The NRZI replica signal 25A corresponds to those periods of time when driver and laser 16 are supplying a high intensity signal recording light beam to media 10 and hence, should have no residual data checking at this time. Tieline 93 represents the logic of operation of NOR circuit 89. AND circuit 92 receives a recording indicating signal over line 91 for passing the line 21 MO detected signals to counter 66.

Figure 6:
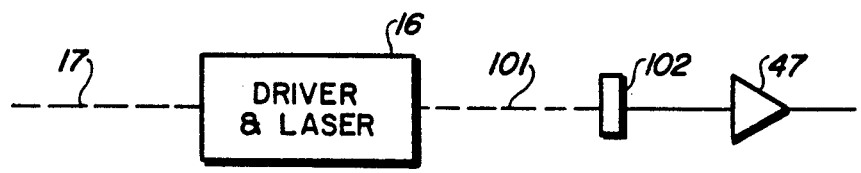
FIG. 6 is an abbreviated block diagram showing an alternate embodiment of the invention.

FIG. 6 illustrates an alternative embodiment of the invention. The laser element (not separately shown) of laser and driver 16 is of the gallium-arsenide type which includes a waste light port emitting light along light path 101, which indicates the intensity of the light emitted by the laser along path 17. When the frequency of operation of the recorder exceeds the band pass of quad detector 34, then a high frequency detector (not shown) can be substituted for the quad detector. Such high frequency detector is directly connected to the input of amplifier 47. In this alternative embodiment, sum circuit 45 is not connected to amplifier 47. Currently, the high frequency detectors may not be sufficiently sensitive to reliably provide photo currents for analysis. In such an instance, the FIG. 6 embodiment may be employed for reduced checking of the recorder operation.

High frequency responsive photodetector 102 intercepts the light travelling along path 101. Photodetector 102 supplies its electric output current directly to the input of amplifier 47. The FIG. 1-illustrated circuits otherwise operate as described. This alternate checks the electrical circuit operation of the illustrated data channels of FIG. 1 but does not check the medium 10 nor the optics 15, 18.

While the invention has been particularly shown and described with reference to its preferred embodiments thereof, it will be understood by those skilled in the art that various changes in form and details may be made therein without departing from the spirit and scope of the invention.

What is claimed is:

1. In the method of operating an optical recorder having a record member responsive to a laser beam to thermally alter a recording layer to represent information-bearing signals when the laser beam exceeds a predetermined intensity level and such thermal alteration does not change the reflectivity of the medium;

while recording signals on the record member by said laser beam wherein new information-bearing signals to be recorded for modulating the intensity of said recording laser beam between intensities above and below said predetermined intensity level in a pattern representing said new information-bearing signals, performing the steps of:

sensing the intensity of the reflected light from the record medium of said recording laser beam for indicating recording laser beam intensity temporal pattern of changes which indicate the information-bearing signals to be recorded on the record member; and comparing the sensed reflected light intensity pattern of changes with the information-bearing signals for indicting media asperities and counting the asperities for indicating media caused errors in the recording of the new information-bearing signals in the record member.

2. In the method set forth in claim 1 wherein the record member had prior recorded information-bearing signals in a areas of the record member which is to store the new information-bearing signals which were erased by deletion wherein the deletion may have left residual recorded information-bearing signals, further including the steps of:

while recording the new information-bearing signals and when the recording laser beam intensity is below the predetermined threshold, sensing said parameters in said medium for determining any residual recorded information-bearing signals; and counting the sensed residual recorded information-bearing signals for indicating a number of the residual information-bearing signals.

3. The method set forth in claim 2, further including the steps of:

selecting the record member to have a magnetooptic recording parameter in which a remnant magnetization reflects incident laser beam radiation with a rotation of light polarization in such incident radiation in rotational directions indicational of polarity of such remnant magnetization.

4. In a method of operating an optical recorder having a laser emitting a beam modulated between light intensities above and below a given intensity threshold to carry input information-bearing signals, a record member in the recorder disposed for intercepting the emitted light beam and responding to the light beam having periods of time with an intensity greater than said threshold to thermally alter an optically sensible parameter a recording layer of the record member for indicating recorded information-bearing signals, said modulating of the light beam including periods of a light intensity below said threshold hereinafter termed a low-light period, interposed between two successive periods of light intensity above said threshold in a temporal pattern representing the input information-bearing signals, said medium requiring erasure by deletion of said recorded information-bearing signals and wherein the deletion may not completely remove the recorded information-bearing signals leaving residual information-bearing signals;

the steps of:

while recording the input information-bearing signals on he record medium, during the low-light periods, sensing for said residual information-bearing signals; and counting the sensed residual information-bearing signals as an indication of probable errors in the recording of the input information-bearing signals.

5. In a method set forth in claim 4 wherein the recorder has, a laser diode having a waste light port which emits light having a modulation having the temporal pattern of said input information-bearing signals which is a replica of the write laser beam;

the steps of:

sensing the emitted light from the waste light port and supplying test data signals indicative of the waste light modulation temporal pattern; and comparing the test data signals with said input information-bearing signals and when the comparison indicates an inequality, signalling an error condition.

* * * * *